(12) United States Patent  
Landy et al.

(10) Patent No.: US 11,741,044 B2  
(45) Date of Patent: Aug. 29, 2023

(54) ISSUING INSTRUCTIONS ON A VECTOR PROCESSOR

(71) Applicant: Microsoft Technology Licensing, LLC, Redmond, WA (US)

(72) Inventors: Aaron Michael Landy, Kent, WA (US); Skand Hurkat, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/566,460

(22) Filed: Dec. 30, 2021

(65) Prior Publication Data

US 2023/0214352 A1 Jul. 6, 2023

(51) Int. Cl.
*G06F 15/80* (2006.01)
*G06F 15/76* (2006.01)

(52) U.S. Cl.
CPC .... *G06F 15/8053* (2013.01); *G06F 2015/768* (2013.01)

(58) Field of Classification Search
None
See application file for complete search history.

(56) References Cited

U.S. PATENT DOCUMENTS

| | | | |
|---|---|---|---|
| 5,488,729 A | 1/1996 | Vegesna et al. | |
| 9,519,617 B2 | 12/2016 | Hung et al. | |
| 9,684,509 B2 | 6/2017 | Khan | |
| 9,928,069 B2 | 3/2018 | Gonion | |
| 10,445,093 B2 | 10/2019 | Eyole et al. | |
| 11,243,778 B1* | 2/2022 | Hurkat | G06F 9/3887 |
| 2007/0198815 A1 | 8/2007 | Liu et al. | |
| 2008/0189531 A1 | 8/2008 | Chaudhry et al. | |
| 2008/0201566 A1* | 8/2008 | Indukuru | G06F 9/3838 712/244 |
| 2010/0332806 A1 | 12/2010 | Golla et al. | |
| 2012/0054329 A1* | 3/2012 | Gulati | H04L 67/1001 709/224 |
| 2016/0371091 A1* | 12/2016 | Brownscheidle | G06F 9/3855 |
| 2017/0161076 A1* | 6/2017 | Alapati | G06F 9/3851 |
| 2019/0163483 A1* | 5/2019 | Silberman | G06F 9/3838 |

(Continued)

OTHER PUBLICATIONS

Severance, A., Broadening the Applicability of FPGA-based Soft Vector Processors, 2015, University of British Columbia, 129 pages. (Year: 2015).*

(Continued)

*Primary Examiner* — Eric Coleman
(74) *Attorney, Agent, or Firm* — RAY QUINNEY & NEBEKER P.C; James Bullough (57) ABSTRACT

The present disclosure relates to a mechanism for issuing instructions in a processor (e.g., a vector processor) implemented as an overlay on programmable hardware (e.g., a field programmable gate array (FPGA) device). Implementations described herein include features for optimizing resource availability on programmable hardware units and enabling superscalar execution when coupled with a temporal single-instruction multiple data (SIMD). Systems described herein involve an issue component of a processor controller (e.g., a vector processor controller) that enables fast and efficient instruction issue while verifying that structural and data hazards between instructions have been resolved.

20 Claims, 7 Drawing Sheets

(56) References Cited

U.S. PATENT DOCUMENTS

| | | | | |
|---|---|---|---|---|
| 2019/0163489 A1* | 5/2019 | Karve | .................. | G06F 9/3851 |
| 2020/0042319 A1* | 2/2020 | Lloyd | .................. | G06F 9/3836 |
| 2021/0326141 A1* | 10/2021 | Tran | ..................... | G06F 9/3838 |

OTHER PUBLICATIONS

Edwards, Joseph James, "Real-time Computer Vision in Software using Custom Vector Overlays", In Thesis of the University of British Columbia, Jul. 2018, 104 Pages.
Jadhav, Abhishek, "SiFive VIU75 Accelerates Vector Math", Retrieved from: https://abopen.com/news/sifive-viu75-accelerates-vector-math/, Oct. 28, 2020, 7 Pages.
Laforest, et al., "Multi-ported memories for FPGAs via XOR", In Proceedings of the ACM/SIGDA international symposium on Field Programmable Gate Arrays, Feb. 22, 2012, pp. 209-218.
Yiannacouras, Peter, "FPGA-Based Soft Vector Processors", In Thesis of University of Toronto, 2009, 191 Pages.
"International Search Report and Written Opinion Issued in PCT Application No. PCT/US22/044939", dated Jan. 20, 2023, 11 Pages.

\* cited by examiner

ISSUING INSTRUCTIONS ON A VECTOR PROCESSOR

BACKGROUND

Recent years have seen a rise in the use of programmable hardware to perform various computing tasks. Indeed, it is now common for many computing applications to make use of programmable arrays of blocks to perform various tasks. These programmable blocks of memory elements provide a useful alternative to application-specific integrated circuits having a more specialized or specific set of tasks. For example, field programmable gate arrays (FPGAs) provide programmable blocks that can be programmed individually and provide significant flexibility to perform various tasks.

In some applications, FPGAs and other programmable hardware units make use of processors capable of interacting with and interfacing with the programmable hardware architecture. These processors provide additional capabilities to perform a variety of operations while achieving high clock frequencies. For instance, vector processors make use of a temporal and spatial single-instruction multiple data (SIMD) paradigm in which a common instruction can process multiple data elements using distinct data paths.

While vector processors can enhance the capability of programmable hardware with respect to performing a variety of operations, facilitating interactions between the vector processor and programmable hardware suffers from a number of drawbacks and limitations. For example, because programmable hardware units typically have a rigid structure of elements, such as lookup tables, adder chains, and dedicated memory that follow a distinct set of protocols and timing constraints, implementing typical processors on programmable hardware is often inefficient and results in undesirable latencies with respect to issuing and processing various instructions. Thus, it is often impractical to interface between processors and programmable hardware units.

These and other problems exist in connection with issuing and processing instructions on a vector processor overlaid on a programmable hardware device.

DETAILED DESCRIPTION

The present disclosure is generally related to a mechanism for issuing instructions in a vector processor overlay on a programmable hardware unit (e.g., an FPGA). Implementations described herein include features and functionality for optimization of resource availability on programmable hardware units and enabling superscalar execution when coupled with a temporal SIMD paradigm for vector execution. As will be discussed in further detail below, a vector processor controller may be implemented as an FPGA overlay to enable fast and efficient instruction issue while verifying that structural and data hazards between instructions have been resolved.

As an illustrative example, and as will be discussed in further detail below, this disclosure describes a vector processor controller that receives an instruction for execution on at least one functional unit of a vector processor. Upon receiving the instruction, the vector processor controller can place the instruction in an issue queue that stages instructions before being issued. that includes a range of instructions that have not successfully issued (e.g., until data and structural hazards have been resolved). The vector processor controller may further apply one or more hazard trackers to issued instructions to determine whether the instructions may be issued safely. In the event that the hazard tracker(s) identifies a potential issue, the vector processor controller may reset the instructions to an earliest instruction not successfully issued.

The present disclosure includes a number of practical applications that provide benefits and/or solve problems associated with issuing instructions by a vector processor in a programmable hardware unit environment. Examples of these applications and benefits are discussed in further detail below.

For example, in one or more embodiments described herein, a vector processor controller can apply a number of hazard trackers in parallel to issuing the instruction(s) and confirming that the instructions can issue safely (e.g., successfully). For instance, rather than waiting some requisite number of cycles (e.g., a number of cycles involved in reading and updating internal data structures in the hazard tracker) between issuing instructions and receiving confirmation or acknowledgement of successful issue of the instructions, the vector processor controller can apply one or more hazard trackers that are configured to determine success of the issued instructions concurrent with the act of issuing the instructions. In this way, the vector processor controller can provisionally issue instructions assuming successful issue of the instructions while concurrently tracking various hazards.

In addition, the vector processor controller may provide features and functionality that facilitate an efficient recovery from an instruction pipeline that encounters a hazard. For example, as will be discussed herein, the vector processor controller can detect hazards while maintaining an issue command queue. For instance, the vector processor controller can maintain an issue command queue including an indication of a range of commands for which acknowledgement of successful issuance has not been received. By maintaining this queue and associated acknowledgement indicators, the vector processor controller enables the vector processor to recover from a detected hazard by resetting or otherwise reverting to an earliest instruction not successfully issued. The vector processor controller may recover in this fashion within a minimal number of processing cycles so as to not cause significant delay in operation of the vector processor and/or continuing to issue additional instructions.

In addition to fixing a pipeline with minimal delay, one or more embodiments described herein facilitate tracking and detecting multiple types of hazards in parallel. For example, the vector processor controller may implement different hazard trackers in parallel that implement different workflows configured to detect different types of hazards (e.g., function unit availability hazard, register file availability hazard, data availability hazard, etc.). Notwithstanding different workflows to detect different types of hazards, the vector processor controller may incorporate features and functionality to synchronize latency of the respective hazard detectors to prevent one or more of the hazard trackers from causing unnecessary delays in the instruction issue pipeline.

In addition to providing the capability to efficiently and quickly identifying different types of hazards, the vector processor controller may additionally provide flexibility in identifying different types of hazards based on different types of instructions. For instance, while one or more embodiments described herein relate specifically to detecting and recovering from availability hazards, one or more embodiments described herein may relate to detecting and recovering from memory hazards. For example, where an issued instruction is a load or a store instruction, the vector processor controller may invoke a memory hazard tracker and apply one or a number of different workflows based on the specific type of memory hazard.

It should be noted that the vector processor controller can provide each of the above benefits while achieving spatial and temporal SIMD. For example, to achieve spatial SIMD, the vector processor controller can use multiple functional units that are configured to do the same function and stamped out in a parallel configuration. The vector processor controller can issue the same instruction to be performed on different pieces of data. To achieve temporal SIMD, the vector processor controller can have a deep pipeline of components and fill the pipeline with independent pieces of data to accomplish temporal SIMD.

As illustrated in the foregoing discussion, the present disclosure utilizes a variety of terms to describe features and advantages of the systems herein. Additional detail is now provided regarding the meaning of some example terms.

For example, as used herein, a "hazard" refers to an instance of a problem in an instruction pipeline in which an instruction cannot be executed without risking an incorrect computational result. One or more embodiments described herein refer to different types of hazards. For example, a hazard may refer to a data hazard, such as in the event where data is not yet available, or where available data may be overwritten before it is ready by a consumer. An example type of data hazard mentioned herein is a memory hazard. As another example, a hazard may refer to a structural hazard, such as a hazard caused by a lack of availability of hardware resources (e.g., a functional unit or a memory port). One or more embodiments described herein refer to availability hazards, which may refer to any hazard caused by a lack of availability of data and/or hardware resource.

As used herein, a "register file" refers to a hardware unit in which data may be written to or read from in accordance with one or more embodiments described herein. In one or more embodiments, a register file includes multiple register file banks on which instances of data may be written to and stored over one or more cycles (e.g., clock cycles). In one or more embodiments described herein data may be replicated across memory register banks to simulate multiple input/output ports in accordance with one or more embodiments specific applications. In one or more embodiments described herein, a register file contains multiple registers.

In one or more embodiments described herein, a vector processor may issue instructions to functional units to perform one or more operations in accordance with a set of instructions. As used herein, a vector processor may refer to a processing architecture including a scalar unit that handles fetching, decoding, and forwarding instructions. A vector processor may further include a vector control unit for issuing and executing instructions. A vector processor may further include vector lanes having a feed-forward design being configured to receive control signals to drive the lanes to complete various vector operations. Each of the lanes may include functional units thereon to perform an operation or set of related operations. Additional information in connection to these respective components will be discussed herein.

Figure 1:
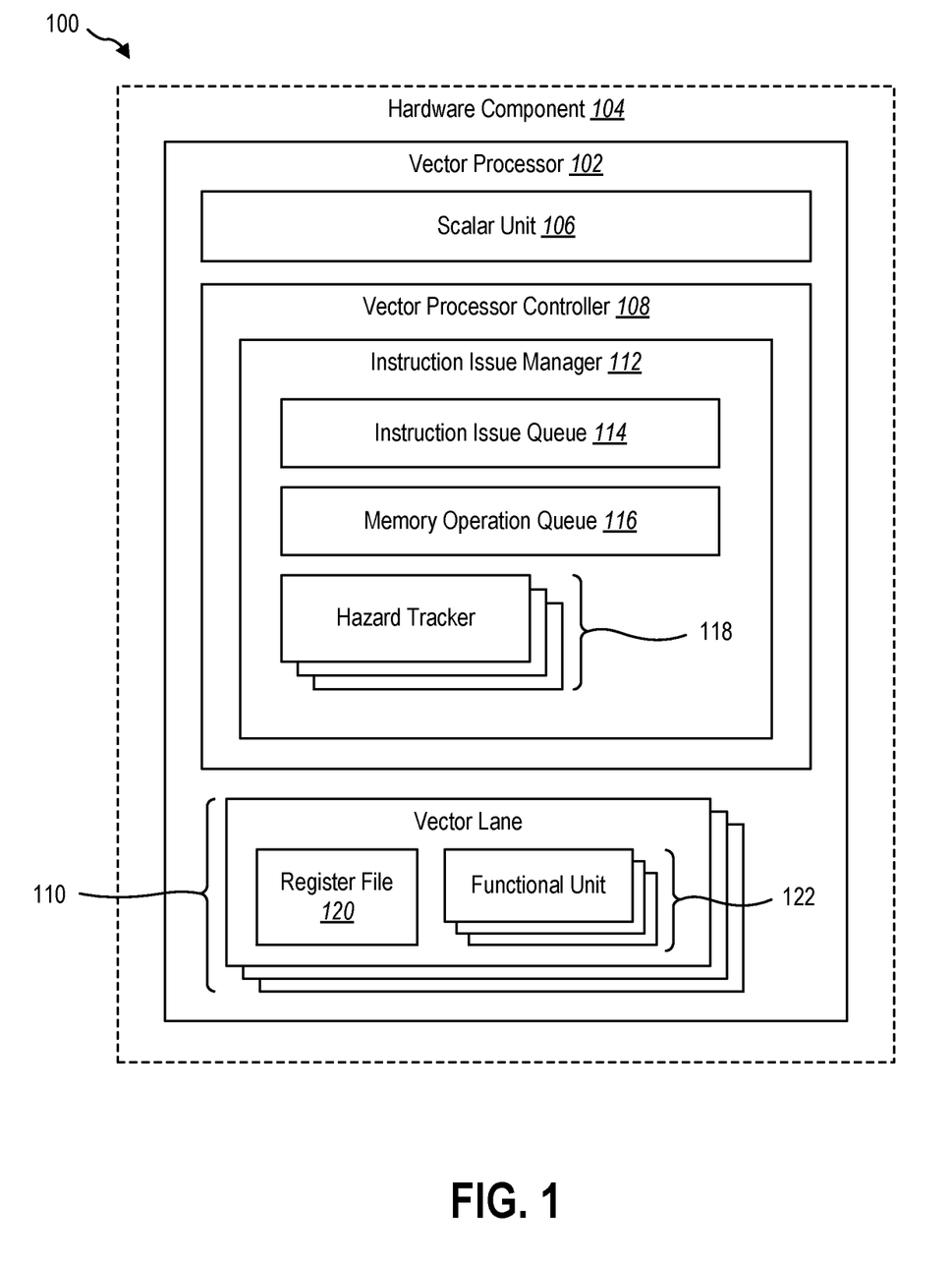
FIG. 1 illustrates an example environment including an example implementation of a vector processor on a programmable hardware unit in accordance with one or more embodiments.

Additional detail will now be provided regarding example of a vector processor controller on a vector processor in relation to illustrative figures portraying example implementations. For example, FIG. 1 illustrates a block diagram showing an example hardware environment 100 including a vector processor 102 on a hardware component 104. In one or more embodiments, the vector processor 102 may refer to a vector processor on a hardware device, such as an FPGA component on an FPGA device having multiple components. As an example, the vector processor 102 on the hardware component 104 may refer to a vector processor implemented on an FPGA overlay and optimized for utilization of a variety of logic modules on the FPGA device. Nevertheless, in one or more implementations, features described herein in connection with example vector processors may similarly apply to processors that use digital signal processing blocks, memories for storage, and other processing components.

As further shown in FIG. 1, the vector processor 102 may include a number of components thereon including, by way of example, a scalar unit 106, vector processor controller 108, and a plurality of vector lanes 110. Additional information in connection with each of these components 106-110 will be discussed in further detail below.

For example, the scalar unit 106 may refer to hardware of the vector processor 102 that handles tasks related to fetching and decoding instructions. In one or more embodiments, the scalar unit 106 forwards vector instructions to a vector unit for execution. In one or more embodiments described below in connection with FIG. 2, the scalar unit 106 expands instructions prior to forwarding the instructions to the vector processor controller 108. While not shown in FIG. 1, the scalar unit 106 may include a number of components, including slow and fast register files, units of memory, arithmetic units, multiplexors, decoders, and other hardware.

The vector processor controller 108 may refer to a control unit of the vector processor 102 configured to control the pipeline of instructions to a plurality of vector lanes 110. As shown in FIG. 1, and as will be discussed in additional detail below, the vector processor controller 108 includes an instruction issue manager 112 configured to manage forwarding instructions to the respective vector lanes 110. In one or more embodiments, the instruction issue manager 112 manages one or more queues of instructions based on instruction-type. For example, in one or more embodiments, the instruction issue manager 112 manages an instruction issue queue 114 for a first type of instruction and a memory operation queue 116 for a second type of instruction. In one or more embodiments, the memory operation queue 116 includes store and load instructions while the instruction issue queue 114 includes all instructions, including load and store instructions.

In addition to the instruction queues 114, 116, the instruction issue manager 112 may further include a plurality of hazard trackers 118. As will be discussed in further detail below, the hazard trackers 118 may be configured to track and detect different types of hazards related to issuing and forwarding instructions by the vector processor controller 108. Examples of hazard trackers 118 described herein include structural availability hazard trackers (e.g., function unit occupancy hazard tracker, register file availability hazard tracker), data availability hazard trackers, and memory hazard tracker(s). Additional information in connection with these hazard trackers 118 will be discussed below in connection with example implementations.

The plurality of vector lanes 110 may include hardware for carrying out or otherwise executing issued instructions by the vector processor controller 108. The vector processor 102 may include any number of vector lanes 110. In addition, each of the vector lanes may include a vector register file 120 and a number of functional units 122. The register file 120 may include a number of register file banks for storing instances of data and, in some instances, may be used to replicate data or simulate additional write and/or read ports. As mentioned above, the vector lanes 110 may have a simple feed-forward device. Control signals from the vector processor controller 108 may drive the vector lanes 110 to complete vector operations. The functional units 122 may be configured to perform one operation or a set of related operations.

As noted above, the vector processor 102 may use a temporal and spatial SIMD paradigm. For example, multiple vector lanes 110 may achieve the spatial paradigm by processing the same instruction across multiple data elements using the different lanes. The temporal SIMD paradigm may be achieved by requiring the instructions to process distinct elements of the vector processor 102 over multiple clock cycles (or simply "cycles"). In one or more embodiments described herein, a length of time over which an instruction is processed may be referred to as a chime or chain execution time. While one or more instructions are executed over a particular chime, other independent instructions may be issued to other functional units that are idle. This utilization of functional units enables superscalar execution within the vector processor 102 as multiple instructions can be executed simultaneously.

Figure 2:
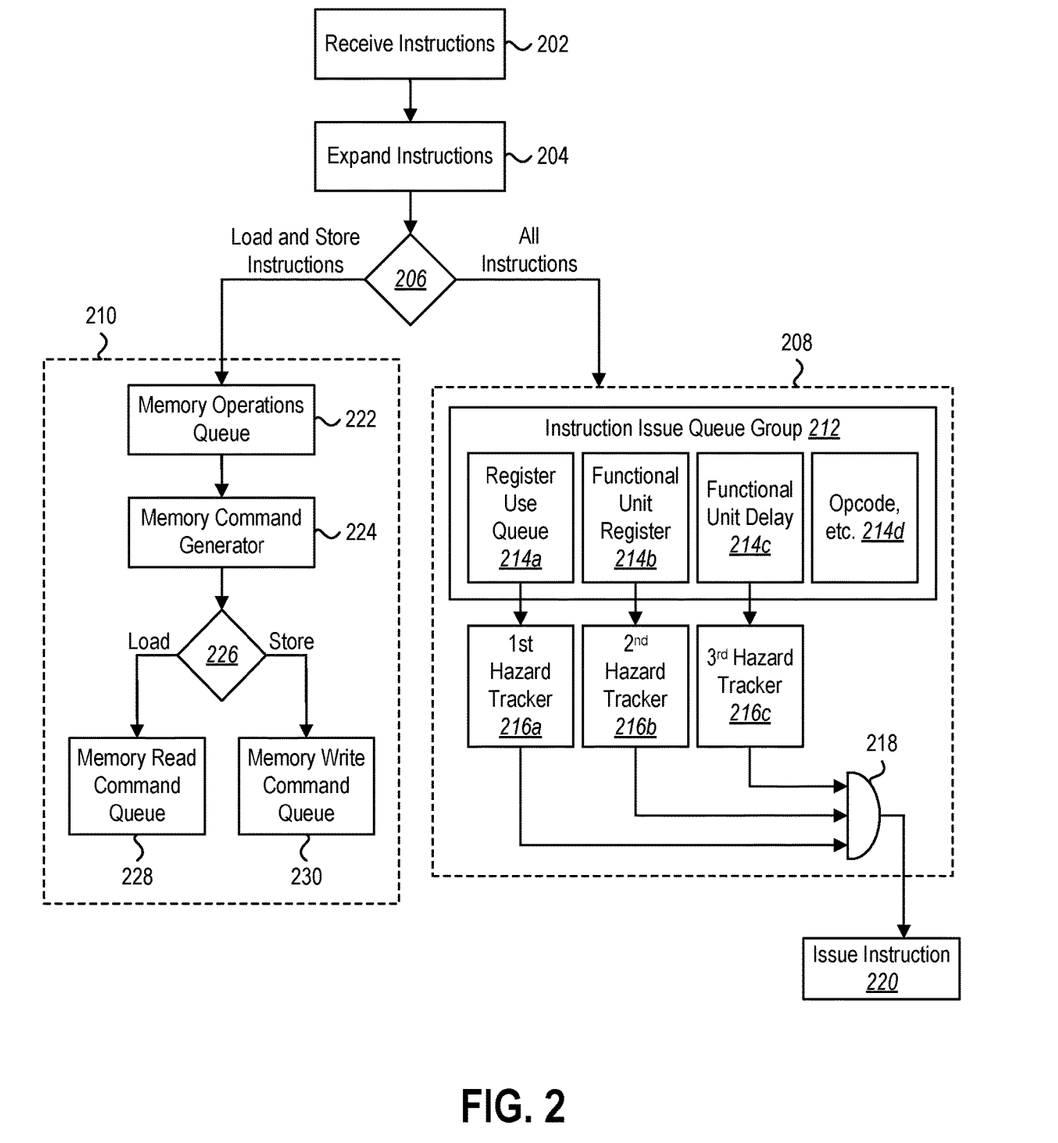
FIG. 2 illustrates an example vector controller in accordance with one or more embodiments.

Additional detail will now be discussed in connection with an example implementation of an instruction issue manager. For example, FIG. 2 illustrates an example overview showing components of and acts performed by an example instruction issue manager. Acts and components of the overview may be inclusive of the instruction issue manager 112. For ease in explanation, this description will indicate these acts as being performed by the vector processor controller 108, which may be reflective of actions being performed by the instruction issue manager 112 or other components of the vector processor generally (e.g., the scalar unit 106 and/or vector lanes 110).

As shown in FIG. 2, the vector processor controller 108 may perform an act 202 of receiving instructions from the scalar unit 106. For example, as discussed above, the scalar unit 106 may generate and provide instructions (e.g., decoded instructions) to the vector processor controller 108 for further processing. In one or more embodiments, the vector processor controller 108 may perform an act 204 of expanding the instructions. For example, the vector processor controller 108 may parse, modify, or otherwise transform the received instructions to a particular format that enables other components of the vector processor controller 108 to understand, issue, and ultimately execute the received instructions.

As shown in FIG. 2, the vector processor controller 108 may perform an act 206 of selectively providing the instructions to the respective queues. For instance, in one or more embodiments, the vector processor controller 108 may determine whether the received instruction (e.g., the expanded instructions) are a first or second type of instruction that should be processed differently by the vector processor controller 108. More specifically, in one or more embodiments, the vector processor controller 108 may determine if the received instructions are a load or store instruction or other type of instruction. As shown in FIG. 2, where the vector processor controller 108 determines that the instruction is a load or store instruction, the vector processor controller 108 may direct the instructions to a processing flow of the memory queue 210 pipeline. Additional information in connection with the memory queue 210 pipeline will be discussed below.

As further shown, independent of the instruction being a load or store instruction, the vector processor controller 108 may provide the instruction(s) to an instruction queue 208 pipeline. As shown in FIG. 2, the vector processor controller 108 may provide the instruction to an instruction issue queue group 212 including memory structures 214a-d. The memory structures 214a-d may refer to independent memory structures. Alternatively, one or more of the memory structures 214a-d may be implemented as a single memory structure, or as a memory structure where individual bitfields correspond to the desired information being tracked. For example, the vector processor controller 108 may pull the instructions from the expanded instructions and insert into each of the register fields, respectively. As shown in FIG. 2, the register fields include a register use queue 214a, a functional unit register 214b, a functional unit delay 214c, and an opcode, etc. memory structure 214d (or simply an "other" category of one or more memory structures).

As further shown in FIG. 2, one or more of the memory structures 214a-d provide instruction data to a plurality of hazard trackers 216a-c that are configured to track one or more availability hazards with respect to corresponding instructions. For example, as mentioned above, the vector processor controller 108 may include a first hazard tracker 216a, which may refer to a register file hazard tracker. The vector processor controller 108 may additionally include a second hazard tracker 216b, which may refer to a functional unit occupancy hazard tracker. The vector processor controller 108 may further include a third hazard tracker 216c, which may refer to a write port arbiter hazard tracker. Each of these hazard trackers 216a-c (and any other additional hazard trackers not specifically discussed herein) may be referred to herein as availability hazard trackers related to availability of one or more resources (e.g., data and/or structures) on the vector process 108. For example, the register file hazard tracker and functional unit occupancy tracker may refer to trackers configured to track or otherwise determine structural availability (e.g., of a register file and/or functional unit) while the write port arbiter hazard tracker may refer to availability of data, and specifically whether a functional unit is writing to a same register in a same cycle or chime as another functional unit (e.g., for a relevant instruction).

As noted above, the plurality of hazard trackers 216a-c can be applied to an instruction concurrent with one another. For example, each of the hazard trackers 216a-c may be applied to an instruction to determine whether a resource or data is available for a specific instruction. As shown in FIG. 2, the hazard trackers 216a-c can provide an indication of any detected hazards (or more specifically, a lack of any detected hazards) to an adder component 218. Where the hazard trackers 216*a-c* each determine availability (or a lack of any hazards), the vector processor controller 108 can perform an act 220 of issuing an instruction and update an instruction queue. As noted above, the instruction queue can include head and tail pointers to indicate a range of instructions for which acknowledgement of successful issue has not been received.

As shown in FIG. 2, in one or more embodiments, upon receiving and expanding the instructions, the vector processor controller 108 uses a set of lookup tables to identify a functional unit, a latency of the functional unit, and which of a plurality of register fields are used by the instruction. These results are placed in the respective memory structures 214*a-d*. Each of the memory structures 214*a-d* may have common head and tail points, so that they may be combined in a wide queue. In one or more embodiments, this is accomplished by determining latency of the respective memory units 214*a-d* and the corresponding hazard trackers 216*a-c* and adjusting or offsetting one or more of the memory units 214*a-d* and/or hazard trackers 216*a-c* to synchronize application of the hazard trackers 216*a-c* to the instructions. This ensures that the hazard trackers 216*a-c* can be applied simultaneously and in parallel with one another and avoid unnecessary delays as a result of one or the specific structures operating out of sync with the others.

As noted above, the four memory structures 214*a-d* may have common head and tail pointers. In one or more embodiments, the instructions are inserted by the expand instruction unit at the tail and issued from the head. The four memory structures 214*a-d* may have independent read pointers or shared read pointers controlled by the respective units that read from these memory structures 214*a-d*. Additional information in connection with each of the memory structures 214*a-d* and corresponding hazard trackers 216*a-c* will be discussed in greater detail below and in connection with FIGS. 3-6.

As shown in FIG. 2, where the vector processor controller 108 determines the instruction(s) refers to a load or store instruction, the vector processor controller 108 may provide the instructions to a memory queue 210 pipeline. For example, as shown in FIG. 2, the vector processor controller 108 may provide the instruction(s) to a memory operations queue 222 which may feed the instruction(s) to a memory command generator 224. In one or more embodiments, the memory command generator 224 reads the instructions from the memory operations queue 222 and may be configured to identify true memory hazards.

As shown in FIG. 2, the vector processor controller 108 may perform an act 226 of determining whether the instruction is a load instruction or a store instruction. Where the instruction is a load instruction, the vector processor controller 108 may provide the instruction to a memory read command queue 228. Alternatively, where the instruction is a store instruction, the vector processor controller 108 may provide the instruction to a memory write command queue 230.

It will be understood that all units of the vector processor controller 108 may be fully pipelined to sustain a throughput of one instruction per cycle in the absence of any detected true data or structural hazards. In one or more embodiments, the vector processor controller 108 updates the queue only upon determining for certain that the instruction(s) has been successfully issued. Nevertheless, as discussed in connection with various examples herein, the vector processor controller 108 does not wait for an instruction to be issued before beginning to process a next instruction based on an assumption that the earlier instruction(s) was successfully issued. In one or more embodiments, the vector processor controller 108 maintains and updates head and tail indicators to indicate which of the instructions have not yet issued. In this way, the vector processor controller 108 may track which instruction of a pipeline of instructions is the earliest instruction that has not successfully issued, which may be used in the event of a detected hazard and resetting the instruction pipeline.

As discussed below, this enables the vector processor controller 108 to reset the instruction pipeline if needed to just after the last instruction to issue successfully in the event of a detected hazard. Moreover, because the memory structures and corresponding hazard trackers are synchronized to have similar latencies, this can be performed without causing additional delay. Indeed, in the event that a hazard is detected, the vector processor controller 108 (e.g., the memory structures 214*a-d* of the instruction issue queue group 212) can reset any number of instructions as needed to revert or otherwise reset the instruction pipeline and restart the last known instruction that was not successfully issued.

Figure 3:
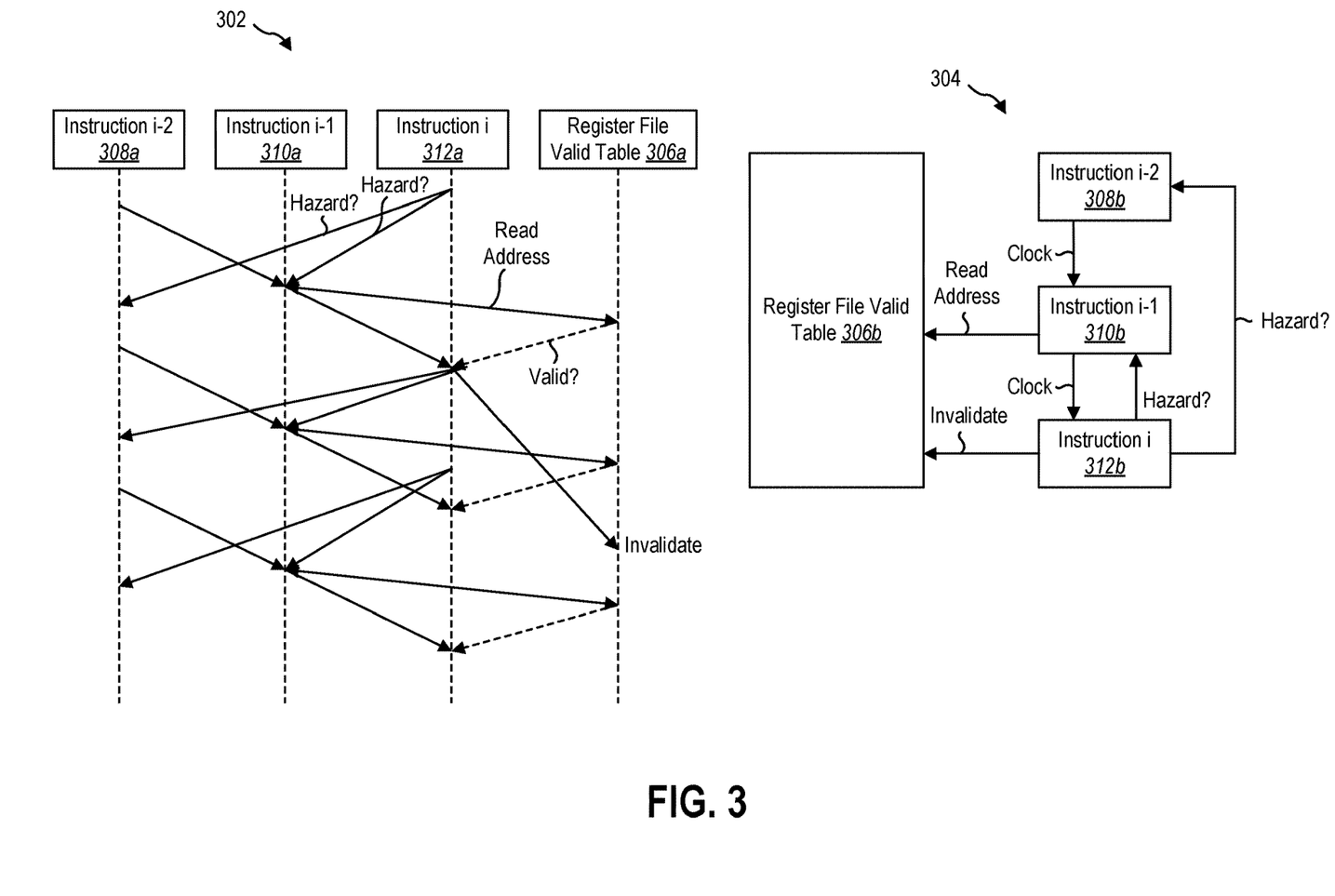
FIG. 3 illustrates an example implementation of a register file hazard tracker in accordance with one or more embodiments.

Additional detail will now be discussed in connection with the respective hazard trackers. For example, FIG. 3 illustrates an example implementation of a register file hazard tracker in accordance with one or more embodiments. The register file hazard tracker shown in FIG. 3 may be an example implementation of the first hazard tracker 216*a* shown in FIG. 2.

In particular, FIG. 3 illustrates a number of views 302-304 showing a workflow and architecture of an example implementation of a register file hazard tracker in accordance with one or more embodiments. For example, as shown in FIG. 3, the register file hazard tracker may track hazards using the register file valid table 306*a-b* (or memory 306*a-b*). Nevertheless, this memory may have a latency of access and a write-to-read latency. Accordingly, an instruction may take N-cycles to determine whether or not a hazard exists and before the register file valid table 306*a-b* may be updated. Thus, the register file hazard tracker must perform hazard checks between instructions that are in flight for the duration that an instruction has not resolved its own hazards. This process is shown in the first view 302.

As shown in FIG. 3, the register file hazard tracker includes a register file valid table 306*a* with three read and two write ports. The register file valid table 306*a* additionally includes one entry for each vector register. A "1" in the register file valid table 306*a* may indicate that the register contains valid data, and an instruction that reads from or writes to this register may be issued. An instruction may set the value of the destination register to "0" when it is issued, and reset the destination to "1" upon completion of execution and the data being written to the register file. In one or more embodiments, value can be set to one a few cycles early based on a structure of the pipeline of the register file hazard tracker such that the data will be written to the register file when the instruction exits the register file hazard tracker.

Following instructions that read or write to a register that does not yet have valid data may be stalled in the register file hazard tracker, preventing them from being issued. As the register file valid table 306*a* must read three distinct register values (destination, source 1, and source 2), it will typically have three read ports. Further, the table may need two write ports (one for writing "0" when the hazard tracker issues an instruction, and another to write "1" when an instruction completes).

In one or more embodiments, the register file valid table 306a uses an XOR function to emulate multiple write ports. For example, FPGA and other hardware devices may often only include one read and one write port, register file hazard tracker may implement an XOR configuration by XORing the outputs from two separate memories. For instance, the register file hazard tracker may read a value from two pieces of memory and whenever an update is performed, the register file hazard tracker may read the other block of memory and simulate the necessary multiple read and write ports, as mentioned above.

FIG. 3 illustrates a three stage pipeline of the register file hazard tracker. The instructions in a second pipeline stage (e.g., i−1) may query a register file valid table 306a to obtain a result of a query, which indicates whether or not there is a hazard in a next stage (i). If there is a hazard, the register file hazard tracker does not issue an instruction and rather enters a replay state where the vector processor controller 108 flushes the pipeline and the register file hazard tracker restarts querying the last instruction that failed to issue. Conversely, if there is no hazard, the register file hazard tracker proceeds to invalidate the destination register in the valid table. The results of this invalidation are not seen until a next cycle. Thus, any hazards between the three instructions 308a-312a in the hazard tracker pipeline stages must be tracked separately. If true register file hazards are detected (e.g., read-after-write or write-after-write), the replay bit for the instruction is set, and the register file hazard tracker is forced to squash the pipeline and replay the instruction sequence starting at the first instruction with the replay bit set.

In connection with the first view 302, FIG. 3 additionally shows a second view 304 (a block view) showing interactions between the respective instruction stages 308b-312b and the register file valid table 306b. These interactions shown in the second view 304 may follow a similar timeline of interactions as shown in the first view 302.

Figure 4:
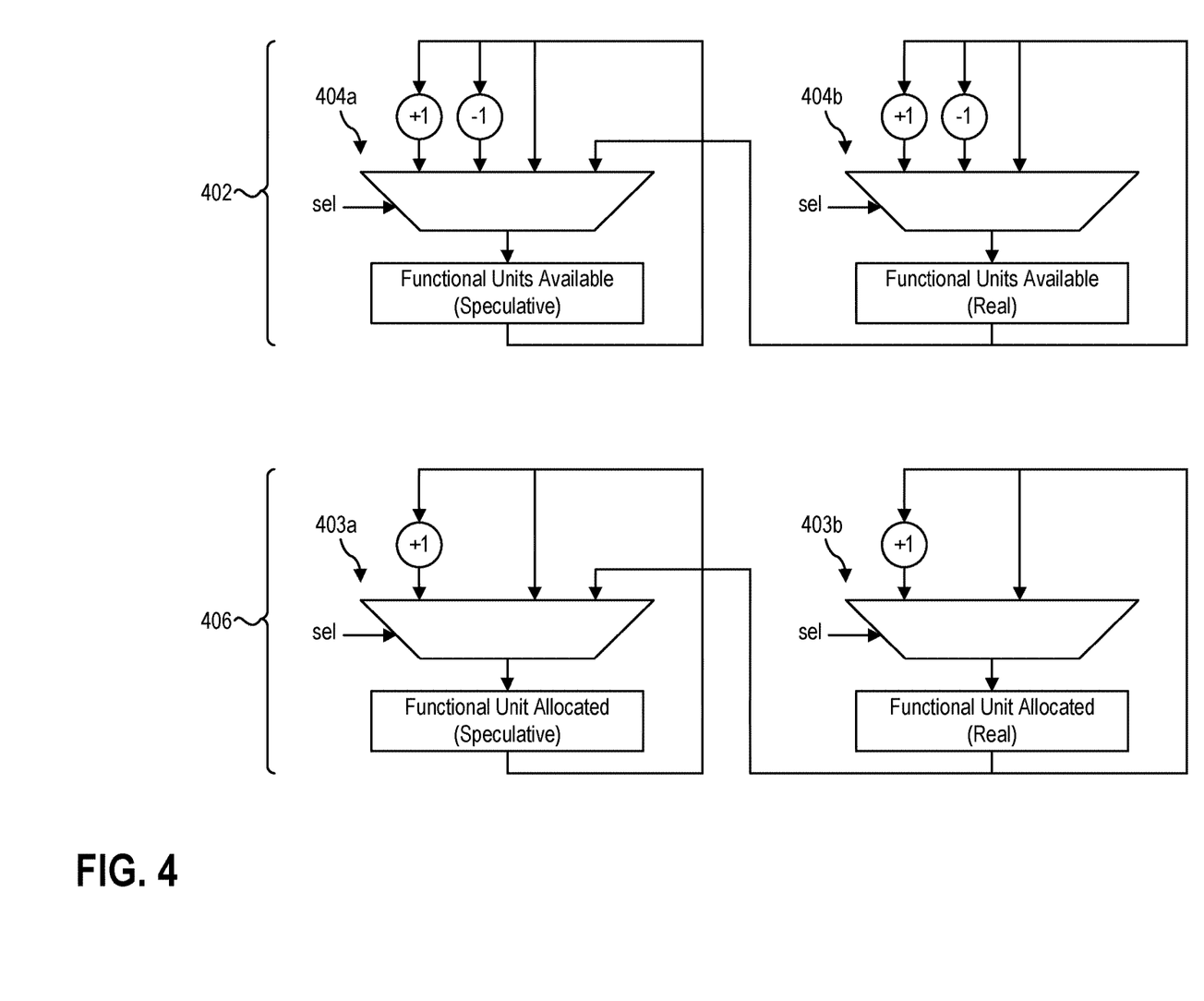
FIG. 4 illustrates an example implementation of a functional unit allocation hazard tracker in accordance with one or more embodiments.

FIG. 4 illustrates an example implementation of a functional unit occupancy hazard tracker in accordance with one or more embodiments. In particular, FIG. 4 illustrates an example workflow including pairs of counters for tracking both a speculative and real number of functional units that are available and which are free to accept instructions. For instance, as shown in FIG. 4, the functional unit allocator may have a first pair of counters 402 including a functional units available speculative counter 404a (or simply "first speculative counter 404a") and a functional units available real counter 404b (or simply "first real counter 404b") As further shown, the functional unit allocator may optionally have a second pair of counters 406 including a functional unit allocated speculative counter 408a (or simply "second speculative counter 408a") and a functional unit allocated real counter 408b (or simply "second real counter 408b").

In one or more embodiments described herein, the functional unit allocator may keep track of how many functional units of each type are available. As noted above, the functional unit allocator may include real counters and speculative counters. The real counters 404b, 408b may iterate a count of available functional units by updating a real functional unit count each time an instruction is issued and confirmed. Alternatively, the speculative counters 404a, 408a may be updated as the instructions are issued and assuming that the functional units are available. The speculative counters can be read early to provide an indication of a predicted number of available functional units while the instruction issue queue is maintained by the vector processor controller 108. Thus, in the event that a functional unit is not available, the functional unit allocator can roll back the speculative value to be the value of the real counter before resetting the instructions from before the detected hazard.

In one or more embodiments, the functional unit allocator performs two tasks. First, the functional unit allocator may calculate if a functional unit of a requested category is available for processing incoming instructions. Second, the functional unit allocator may identify which of the functional units of the category is free to accept the instruction.

As noted above, FIG. 4 shows an architecture of an example functional unit allocator including the two pairs of counters 402, 406 with each set of counters including a speculative counter and real counter. The first pair of counters 402 tracks a number of functional units available in a requested category. The first non-speculative counter 404b may be updated when an instruction has started or completed issuing. The first speculative counter 404a may be updated a few cycles early to account for pipeline latency of the functional unit allocator. Thus, as noted above, the functional unit allocator speculates on functional unit availability to decrease latency. Nevertheless, in the event that the speculation is incorrect (e.g., as a result of an instruction failing to issue for some reason), the values of the real counters 404b, 408b are copied over to the speculative counters 404a, 408a), and the instruction issue mechanism starts a replay.

Consistent with the example shown in FIG. 4, when an instruction arrives, a speculative counter for a requested category of functional units is checked to identify if a functional unit will be available by the time the instruction is issued. If the functional unit is not available, the instruction may be marked as 'unable to issue,' which will trigger a replay later in the vector processor controller 108. Where the functional unit is available, the speculative number of available units will be decremented. The speculative counter of the functional unit allocator may then be copied over to the instruction and incremented so that the issue unit round-robins through the functional units in a given category. After a number of cycles is equal to a chime (e.g., the initiation interval for all functional units in the vector processor 102), the speculative counter of available functional units in the given category may be incremented. The real counter may follow a similar mechanism, with a difference that the real counter is decremented when an instruction is issued and incremented vector chime cycles.

In implementing the decrement mechanism, selective instruction segments, such as the functional unit requested and destination registers, may be entered into a side queue once issued. The queue may have taps or indicators at appropriate latencies to increment the speculative and real counters. The side queue may be used for the entire instructions issue manager 112, including the first and third hazard trackers.

Figure 5:
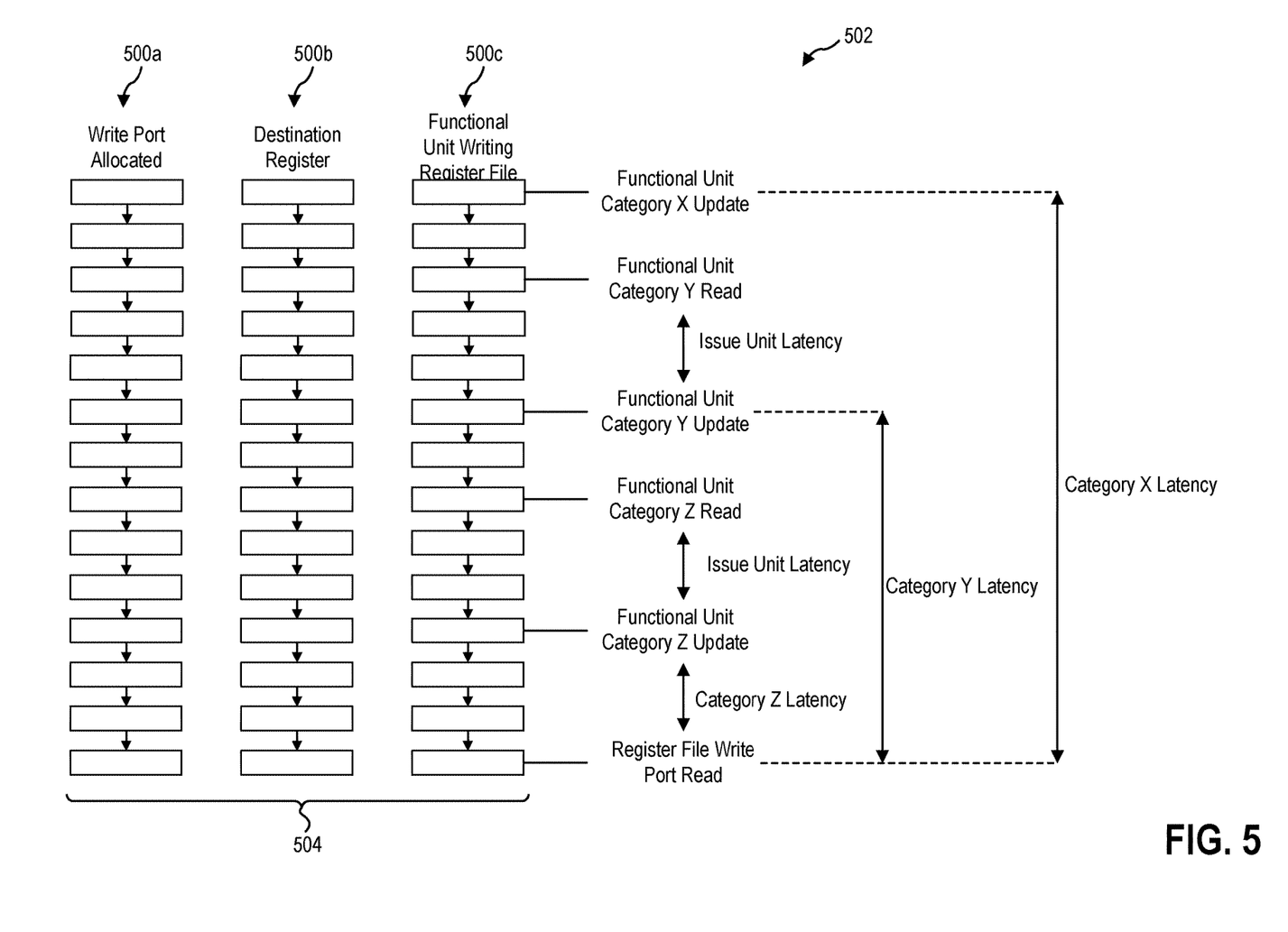
FIG. 5 illustrates an example implementation of a write port availability hazard tracker in accordance with one or more embodiments.

FIG. 5 illustrates an example architecture of a write port arbiter hazard tracker 502 (Or simply "write port arbiter 502") in accordance with one or more embodiments described herein. The write port arbiter 502 may be configured to determine which functional unit can write to a register file write port. Because many hardware devices (e.g., FPGAs) have a limited number of write ports (e.g., one write port), the write port arbiter 502 can make use of a shift register 504 as shown in FIG. 5. The shift register may include a number of spaces to indicate values indicating availability of an allocated write port 506a, a destination register 506b, and a functional unit writing register file 506c. As an instruction is issued, the write port arbiter 502 may identify a latency of the functional unit and place values for the function in within the shift register 504 based on the latency of the functional unit. For example, where the write port arbiter 502 needs to read the availability of the write port a couple of cycles early, the write port arbiter 502 may read the write port availability value a couple of cycles early. In the example shown in FIG. 5, the write port arbiter 502 may read the write port availability two cycles early based on the known latency of a functional unit.

In one or more embodiments, the write port arbiter 502 is configured to detect a hazard associated with ensuring that only one functional unite can write to a given bank of a register file for a given cycle. Since functional units typically access sequential banks of a register file in consecutive cycles, it may be sufficient to examine only a first bank (e.g., bank '0') of a register file and mitigate hazards on this bank.

As noted above, FIG. 5 shows the architecture of the write port arbiter 502. As further discussed, the write port arbiter 502 may be implemented as a shift register 504 with appropriate taps corresponding to latency of each category of functional units. The length of the shift register 504 may be the same as a longest latency functional unit. The end of the shift register 504 may be read by a register file write port to determine if the bank register file is written to a given cycle, which the functional unit writes to the register file. When an instruction is issued, an appropriate tap for the category of functional unit is used to update the fields in the shift register 504. In one or more embodiments, the fields of the shift register 504, may be queried a few cycles earlier causing the shift register 504 to have additional series of read taps located on the issue unit (e.g., the instruction issue manager 112) latency prior to the update taps. To ensure correct operation, the write port arbiter 502 may ensure that there are no additional write taps between read and write taps of a corresponding functional unit category. In one or more embodiments, the write port arbiter 502 may pad functional units to similar latencies to minimize stalls caused as a result of read and write port conflicts.

Figure 6:
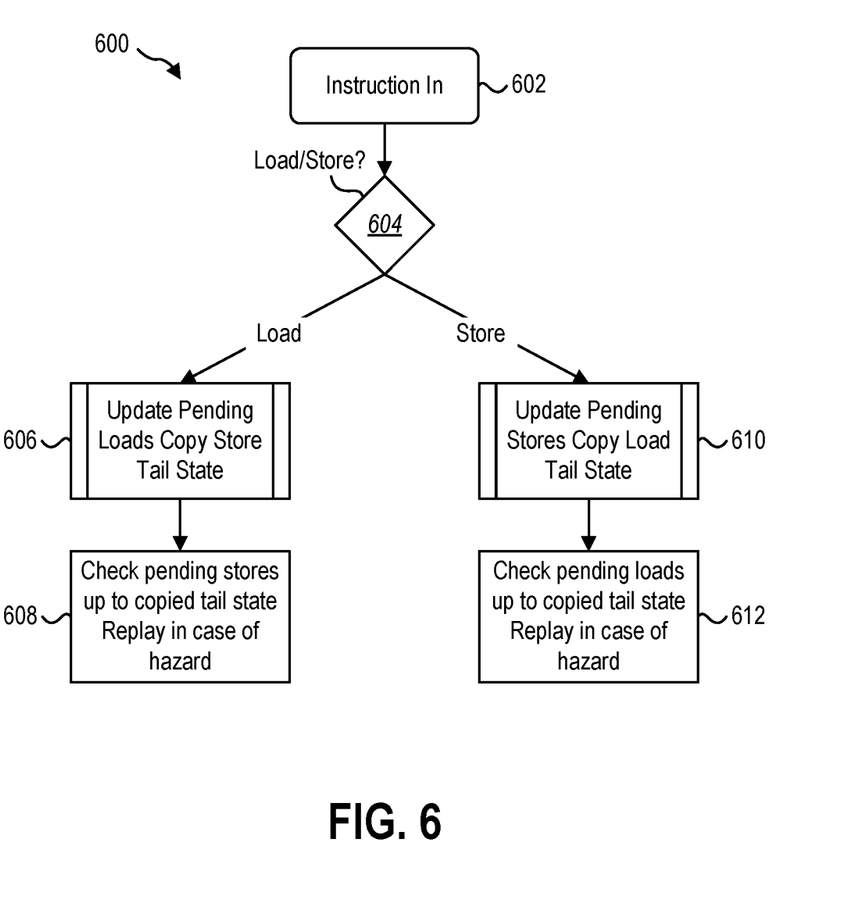
FIG. 6 illustrates an example implementation of a memory hazard tracker in accordance with one or more embodiments.

While FIGS. 3-5 relate primarily to availability hazards in the event that an instruction is something other than a load or store, FIG. 6 illustrates an example workflow for detecting and recovering from memory hazards. For example, FIG. 6 illustrates an example series of acts 600 performed by the components of the memory queue 210 discussed above in connection with FIG. 2.

As shown in FIG. 6, a memory hazard tracker may perform an act 602 of receiving a load or store instruction. Upon receiving the load or store instruction and initiating the workflow of the memory queue 210 (e.g., rather than the instruction issue queue 208), the memory hazard tracker may perform an act 604 of determining whether the instruction is a load instruction or a store instruction.

As shown in FIG. 6, if the instruction is a load instruction, the memory hazard tracker may perform an act 606 of updating pending loads and copying the store tail state. As further shown, the memory hazard tracker may perform an act 608 of checking pending stores up to the copied tail state. In the event of a detected hazard, the act 608 may involve replaying the instructions from the last known instruction to issue (e.g., based on the tail state). Conversely, in the event that the instruction is a store instruction, the memory hazard tracker may perform an act 610 of updating pending stores and copying the load tail state. As further shown, the memory hazard tracker may perform an act 612 of checking pending loads up the copied tail state. In the event of a detected hazard, the act 612 may involve replaying the instructions from the last known instruction to issue.

Consistent with FIG. 6, in one or more embodiments, the memory hazard tracker is responsible for ensuring that loads and stores to a given address occur in program order. Specifically, in one or more implementations, all loads need to occur in program order and all stores need to occur in program order. Where loads and stores read or write to the same address in memory, the instructions must be serialized in program order. In one or more embodiments, the memory hazard tracker may generate these commands as early as possible to minimize stalls due to memory dependencies, and therefore, does not use the same read pointer as the rest of the issue unit (e.g., the instruction issue manager 112).

As an illustrative example, loads and stores may be sequentially entered into a series of memory queues. Each queue may include an independently addressable memory bank. Further, all memory banks may share a head, tail, and read points, but have independent write-enable signals to facilitate writing data sequentially. As a load-specific example, where a load enters the queue, the addresses may be sequentially written from a first bank (bank '0') to an Nth bank (bank 'N') and the tail pointer may be incremented while addresses are written back to the first bank. The memory hazard tracker may use a series of shift registers that show which entries pointed to by the head and tail contain valid outstanding loads. As additional pending loads are written, a '1' value may be shifted into a tail valid shift register. As loads are completed, a '0' value may be shifted to a head valid shift register to indicate one fewer load to complete. When the head valid shift register reaches an all-bit-zero state, the head pointer may be incremented, and the head valid shift register may be reset with all bits set to '1'. Similarly, when the tail valid shift register reaches the all-bits-one state, the bits may be reset to '0' and the tail pointer may be incremented. In this configuration, any set of pending loads read between the head and tail pointers will have pending valid entries. If the head and tail pointers are equal, then the memory hazard tracker may get the valid pending loads using a bitwise AND operation between the head valid shift register and the tail valid shift register.

In one or more embodiments, the memory hazard tracker may need to issue one memory read and one memory write command every four cycles. Thus, where N=8 (referring to eight memory banks in a pending load and pending store queue), the memory hazard tracker can perform thirty-two address comparisons in four cycles.

Figure 7:
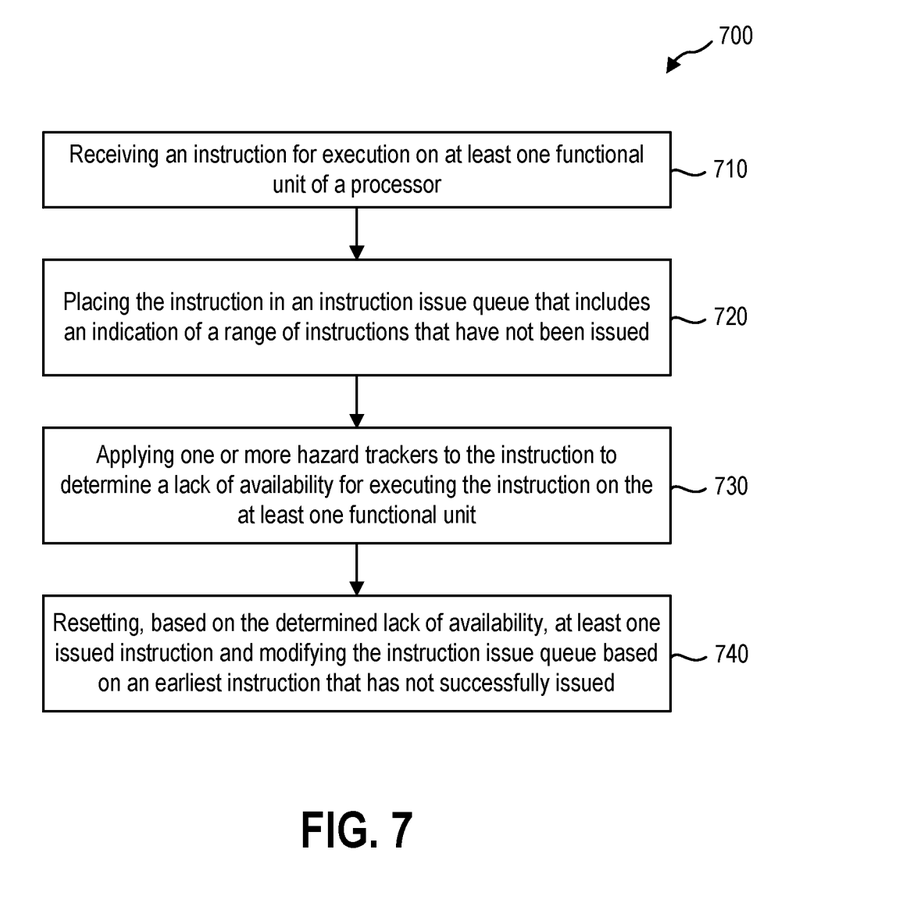
FIG. 7 illustrates an example series of acts for issuing instructions on a vector processor in accordance with one or more embodiments.

Turning now to FIG. 7, this figure illustrates an example flowchart including a series of acts for issuing instructions and resolving detected hazards in accordance with one or more embodiments. While FIG. 7 illustrates acts according to one or more embodiments, alternative embodiments may omit, add to, reorder, and/or modify any of the acts shown in FIG. 7. The acts of FIG. 7 can be performed as part of a method. Alternatively, a non-transitory computer-readable medium can include instructions that, when executed by one or more processors, cause a computing device (e.g., a server device) to perform the acts of FIG. 7. In still further embodiments, a system can perform the acts of FIG. 7.

As mentioned above, FIG. 7 illustrates an example series of acts 700 for issuing instructions and resolving detected hazards in accordance with one or more embodiments. As shown in FIG. 7, the series of acts 700 may include an act 710 of receiving an instruction for execution on at least one functional unit of a processor. For example, in one or more implementations, the act 710 may involve receiving, by a control unit, an instruction for execution on a functional unit of the processor.

As further shown, the series of acts 700 may include an act 720 of placing the instructions in an instruction queue that includes an indication of a range of instructions that have not been issued. For example, in one or more embodiments, the act 720 may involve placing the instruction in an instruction issue queue, the instruction issue queue including a plurality of instructions received by the control unit where the instruction issue queue includes an indication of a range of instructions that have not been issued.

As further shown, the series of acts 700 may include an act 730 of applying one or more hazard trackers to the instruction to determine a lack of availability for executing the instruction on the at least one functional unit. For example, in one or more embodiments, the act 730 involves applying at least one hazard tracker to the instruction to determine a lack of resource availability for executing the instruction on the at least one functional unit.

As further shown, the series of acts 700 may include an act 740 of resetting, based on the determined lack of availability, at least one issued instruction and modifying the instruction issue queue based on an earliest instruction that has not successfully issued. For example, in one or more embodiments, the act 740 involves resetting, based on determining the lack of availability for executing the instruction on the at least one functional unit, at least one issued instruction and modifying the instruction issue queue based on an earliest instruction that has not successfully issued.

In one or more embodiments, the programmable hardware is a field programmable gate array (FPGA) device. Further, in one or more embodiments, the processor is a vector processor implemented as an overlay on the FPGA device. In one or more embodiments, the range of instructions includes a head pointer indicating a slot of an earliest instruction of the instruction issue queue that has not successfully issued. The range of instructions may further include a tail pointer indicating a slot of a most recent instruction added to the instruction issue queue or a slot after the most recent instruction added to the instruction issue queue.

In one or more embodiments, placing the instructions in the instruction issue queue and applying the at least one hazard tracker to the instructions are performed based on an assumption that the instruction will issue successfully. In one or more embodiments, the control unit attempts to issue the instruction prior to the at least one hazard tracker confirming availability for executing the instruction on the at least one functional unit.

In one or more embodiments, applying the at least one hazard tracker includes applying a first hazard tracker configured to verify structural availability for one or more of a register file or a functional unit and applying a second hazard tracker configured to verify data availability. In one or more embodiments, applying the hazard tracker(s) includes identifying a latency of the at least one functional unit and causing one or more of the first hazard tracker and the second hazard tracker to initiate checking for an associated hazard type based on the identified latency of the at least one functional unit.

In one or more embodiments, applying the at least one hazard includes applying a register file hazard tracker to the instruction to determine whether data is available for the instruction to start executing. In one or more embodiments, applying the at least one hazard tracker includes applying a functional unit occupancy hazard tracker to determine whether the at least one functional unit is available to execute the instruction. In one or more embodiments, applying the at least one hazard tracker includes applying a write port arbiter hazard tracker to determine whether another functional unit is not writing to a same bank of a register file in the same cycle as the at least one functional unit (e.g., where a register file has multiple banks). Alternatively, where a register file only has one bank, the write port arbiter hazard tracker may determine whether another functional unit is not writing to the same register file.

In one or more embodiments, the control unit is positioned between a scalar unit that provides expanded instructions to the control unit and a plurality of lanes (e.g., vector lanes) having functional units thereon for executing the plurality of instructions.

In one or more embodiments, applying the at least one hazard tracker includes applying a first hazard tracker to the instruction, the first hazard tracker being a register file hazard tracker configured to determine whether data is available for the instruction to start executing. In one or more embodiments, applying the at least one hazard tracked includes applying a second hazard tracker to the instruction, the second hazard tracker being a functional unit occupancy hazard tracker configured to determine whether the at least one functional unit is available to execute the instruction. In one or more embodiments, applying the at least one hazard tracker includes applying a third hazard tracker to the instruction, the third hazard tracker being a write port arbiter hazard tracker configured to determine whether another functional unit is writing to a same register in the same cycle as the at least one functional unit. In one or more embodiments, the first hazard tracker, second hazard tracker, and third hazard tracker are applied to the instruction in parallel with one another.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method being implemented by a processor as an overlay on programmable hardware, the method comprising:
    receiving, by a control unit, an instruction for execution on a functional unit of the processor;
    placing the instruction in an instruction issue queue, the instruction issue queue including a plurality of instructions received by the control unit, and wherein the instruction issue queue includes an indication of a range of instructions that have not been issued;
    applying at least one hazard tracker to the instruction to determine a lack of resource availability for executing the instruction on the at least one functional unit, wherein the control unit attempts to issue the instruction prior to the at least one hazard tracker confirming availability for executing the instructions on the at least one functional unit; and
    resetting, based on determining the lack of availability for executing the instruction on the at least one functional unit, at least one issued instruction and modifying the instruction issue queue based on an earliest instruction that has not successfully issued.

2. The method of claim 1, wherein the programmable hardware is a field programmable gate array (FPGA) device.

3. The method of claim 2, wherein the processor is a vector processor implemented as an overlay on the FPGA device.

4. The method of claim 1, wherein the range of instructions includes:
    a head pointer indicating a slot of an earliest instruction of the instruction issue queue that has not successfully issued; and
    a tail pointer indicating a slot of a most recent instruction added to the instruction issue queue or a slot after the most recent instruction added to the instruction issue queue.

5. The method of claim 1, wherein placing the instructions in the instruction issue queue and applying the at least one hazard tracker to the instructions are performed based on an assumption that the instruction will issue successfully.

6. The method of claim 1, wherein applying the at least one hazard tracker comprises:
    applying a first hazard tracker configured to verify structural availability for one or more of a register file or a functional unit; and
    applying a second hazard tracker configured to verify data availability.

7. The method of claim 6, wherein applying the at least one hazard tracker comprises:
    identifying a latency of the at least one functional unit; and
    causing one or more of the first hazard tracker and the second hazard tracker to initiate checking for an associated hazard type based on the identified latency of the at least one functional unit.

8. The method of claim 1, wherein applying the at least one hazard comprises applying a register file hazard tracker to the instruction to determine whether data is available for the instruction to start executing.

9. The method of claim 1, wherein applying the at least one hazard tracker comprises applying a functional unit occupancy hazard tracker to determine whether the at least one functional unit is available to execute the instruction.

10. The method of claim 1, wherein applying the at least one hazard tracker comprises applying a write port arbiter hazard tracker to determine whether another functional unit is not writing to a same bank of a register file in the same cycle as the at least one functional unit.

11. The method of claim 1, wherein the control unit is positioned between:
    a scalar unit that provides expanded instructions to the control unit; and
    a plurality of lanes having functional units thereon for executing the plurality of instructions.

12. The method of claim 1, wherein applying the at least one hazard tracker comprises:
    applying a first hazard tracker to the instruction, the first hazard tracker being a register file hazard tracker configured to determine whether data is available for the instruction to start executing;
    applying a second hazard tracker to the instruction, the second hazard tracker being a functional unit occupancy hazard tracker configured to determine whether the at least one functional unit is available to execute the instruction;
    applying a third hazard tracker to the instruction, the third hazard tracker being a write port arbiter hazard tracker configured to determine whether another functional unit is writing to a same register in the same cycle as the at least one functional unit.

13. The method of claim 12, wherein the first hazard tracker, the second hazard tracker, and the third hazard tracker are applied to the instruction in parallel with one another.

14. A processor implemented as an overlay on programmable hardware, comprising:
- a scalar unit configured to fetch and decode instructions;
- a plurality of lanes comprising functional units thereon configured to execute instructions; and
- a control unit being configured to:
  - receive, from the scalar unit, an instruction for execution on a functional unit of the processor;
  - place the instruction in an instruction issue queue, the instruction issue queue including a plurality of instructions received by the control unit, and wherein the instruction issue queue includes an indication of a range of instructions that have not been issued;
  - apply at least one hazard tracker to the instruction to determine a lack of resource availability for executing the instruction on the at least one functional unit, wherein the control unit attempts to issue the instruction prior to the at least one hazard tracker confirming availability for executing the instructions on the at least one functional unit; and
  - reset, based on determining the lack of availability for executing the instruction on the at least one functional unit, at least one issued instruction and modifying the instruction issue queue based on an earliest instruction that has not successfully issued.

15. The processor of claim 14, wherein the range of instructions includes:
- a head pointer indicating a slot of an earliest instruction of the instruction issue queue that has not successfully issued; and
- a tail pointer indicating a slot of a most recent instruction added to the instruction issue queue or a slot after the most recent instruction added to the instruction issue queue.

16. The processor of claim 14, wherein the control unit is further configured to place the instructions in the instruction issue queue and apply the at least one hazard tracker to the instructions based on an assumption that the instruction will issue successfully.

17. The processor of claim 14, wherein applying the at least one hazard comprises applying a register file hazard tracker to the instruction to determine whether data is available for the instruction to start executing.

18. The processor of claim 14, wherein applying the at least one hazard tracker comprises applying a functional unit occupancy hazard tracker to determine whether the at least one functional unit is available to execute the instruction.

19. The processor of claim 14, wherein applying the at least one hazard tracker comprises applying a write port arbiter hazard tracker to determine whether another functional unit is writing to a same register in the same cycle as the at least one functional unit.

20. The processor of claim 14, wherein applying the at least one hazard tracker comprises:
- applying a first hazard tracker to the instruction, the first hazard tracker being a register file hazard tracker configured to determine whether data is available for the instruction to start executing;
- applying a second hazard tracker to the instruction, the second hazard tracker being a functional unit occupancy hazard tracker configured to determine whether the at least one functional unit is available to execute the instruction; and
- applying a third hazard tracker to the instruction, the third hazard tracker being a write port arbiter hazard tracker configured to determine whether another functional unit is not writing to a same bank of a register file in the same cycle as the at least one functional unit.

* * * * *